US007137032B2

(12) United States Patent
Lubbers et al.

(10) Patent No.: US 7,137,032 B2
(45) Date of Patent: *Nov. 14, 2006

(54) SYSTEM AND METHOD FOR ENSURING MERGE COMPLETION IN A STORAGE AREA NETWORK

(75) Inventors: Clark Lubbers, Colorado Springs, CO (US); Susan Elkington, Colorado Springs, CO (US); Randy Hess, Colorado Springs, CO (US); Stephen J. Sicola, Palmer Lake, CO (US); James McCarty, Colorado Springs, CO (US); Anuja Korgaonkar, Colorado Springs, CO (US); Jason Leveille, Colorado Springs, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 11/167,688

(22) Filed: Jun. 27, 2005

(65) Prior Publication Data

US 2005/0262298 A1  Nov. 24, 2005

Related U.S. Application Data

(63) Continuation of application No. 10/106,909, filed on Mar. 26, 2002, now Pat. No. 7,032,131.

(51) Int. Cl.
*G06F 11/00* (2006.01)
*G06F 11/16* (2006.01)

(52) U.S. Cl. .............................. 714/16; 714/13; 714/18; 714/20; 709/231; 709/233

(58) Field of Classification Search .................. 714/16
See application file for complete search history.

(56) References Cited

U.S. PATENT DOCUMENTS

| 5,913,215 | A | * | 6/1999 | Rubinstein et al. ........... 707/10 |
| 5,923,876 | A | | 7/1999 | Teague |
| 6,161,192 | A | | 12/2000 | Lubbers |
| 6,170,063 | B1 | | 1/2001 | Golding |
| 6,295,578 | B1 | | 9/2001 | Dimitroff |
| 6,397,293 | B1 | | 5/2002 | Shrader |
| 6,487,636 | B1 | | 11/2002 | Dolphin |
| 6,490,122 | B1 | | 12/2002 | Holmquist et al. |
| 6,493,656 | B1 | | 12/2002 | Houston |
| 6,505,268 | B1 | | 1/2003 | Schultz |
| 6,523,749 | B1 | | 2/2003 | Reasoner |
| 6,546,459 | B1 | | 4/2003 | Rust |
| 6,560,673 | B1 | | 5/2003 | Elliot |
| 6,587,962 | B1 | | 7/2003 | Hepner |
| 6,594,745 | B1 | | 7/2003 | Grover |
| 6,601,187 | B1 | | 7/2003 | Sicola |
| 6,606,690 | B1 | | 8/2003 | Padovano |

(Continued)

*Primary Examiner*—Donald Sparks
*Assistant Examiner*—Jesse Diller

(57) ABSTRACT

Methods and systems for managing disk capacity allocated to a data log in a source data storage system during a merge process are disclosed. Data in the data log may be merged into corresponding data on a destination storage system connected to the source data storage system by at least one communication link. In one embodiment a method comprises maintaining a ratio of merge writes out of the data log to writes from a host computer into the data log within a desired range until the write process reaches a predetermined distance from the end of the data log, and quiescing writes from a host computer into the data log until the data log is fully written to the destination storage system.

32 Claims, 9 Drawing Sheets

U.S. PATENT DOCUMENTS

| | | | |
|---|---|---|---|
| 6,609,145 B1 | 8/2003 | Thompson | |
| 6,629,108 B1 | 9/2003 | Frey | |
| 6,629,273 B1 | 9/2003 | Patterson | |
| 6,643,795 B1 * | 11/2003 | Sicola et al. | 714/6 |
| 6,647,514 B1 | 11/2003 | Umberger | |
| 6,658,590 B1 | 12/2003 | Sicola | |
| 6,663,003 B1 | 12/2003 | Johnson | |
| 6,681,308 B1 | 1/2004 | Dallmann | |
| 6,708,285 B1 | 3/2004 | Oldfield | |
| 6,715,101 B1 | 3/2004 | Oldfield | |
| 6,718,404 B1 | 4/2004 | Reuter | |
| 6,718,434 B1 | 4/2004 | Veitch | |
| 6,721,902 B1 | 4/2004 | Cochran | |
| 6,725,393 B1 | 4/2004 | Pellegrino | |
| 6,742,020 B1 | 5/2004 | Dimitroff | |
| 6,745,207 B1 | 6/2004 | Reuter | |
| 6,763,409 B1 | 7/2004 | Elliot | |
| 6,772,231 B1 | 8/2004 | Reuter | |
| 6,775,790 B1 | 8/2004 | Reuter | |
| 6,795,904 B1 | 9/2004 | Kamvysselis | |
| 6,802,023 B1 | 10/2004 | Oldfield | |
| 6,807,605 B1 | 10/2004 | Umberger | |
| 6,817,522 B1 | 11/2004 | Brignone | |
| 6,823,453 B1 | 11/2004 | Hagerman | |
| 6,839,824 B1 | 1/2005 | Camble | |
| 6,842,833 B1 | 1/2005 | Phillips | |
| 6,845,403 B1 | 1/2005 | Chadalapaka | |
| 6,934,826 B1 * | 8/2005 | Lubbers et al. | 711/170 |
| 2002/0019863 A1 | 2/2002 | Reuter | |
| 2002/0019908 A1 | 2/2002 | Reuter | |
| 2002/0019920 A1 | 2/2002 | Reuter | |
| 2002/0019922 A1 | 2/2002 | Reuter | |
| 2002/0019923 A1 | 2/2002 | Reuter | |
| 2002/0048284 A1 | 4/2002 | Moulton | |
| 2002/0188800 A1 | 12/2002 | Tomaszewski | |
| 2003/0051109 A1 | 3/2003 | Cochran | |
| 2003/0056038 A1 | 3/2003 | Cochran | |
| 2003/0063134 A1 | 4/2003 | Lord | |
| 2003/0074492 A1 | 4/2003 | Cochran | |
| 2003/0079014 A1 | 4/2003 | Lubbers | |
| 2003/0079074 A1 | 4/2003 | Sicola | |
| 2003/0079082 A1 | 4/2003 | Sicola | |
| 2003/0079083 A1 | 4/2003 | Lubbers | |
| 2003/0079102 A1 | 4/2003 | Lubbers | |
| 2003/0079156 A1 | 4/2003 | Sicola | |
| 2003/0084241 A1 | 5/2003 | Lubbers | |
| 2003/0101318 A1 | 5/2003 | Kaga | |
| 2003/0110237 A1 | 6/2003 | Kitamura | |
| 2003/0126315 A1 | 7/2003 | Tan | |
| 2003/0126347 A1 | 7/2003 | Tan | |
| 2003/0140191 A1 | 7/2003 | McGowen | |
| 2003/0145045 A1 | 7/2003 | Pellegrino | |
| 2003/0145130 A1 | 7/2003 | Schultz | |
| 2003/0170012 A1 | 9/2003 | Cochran | |
| 2003/0177323 A1 | 9/2003 | Popp | |
| 2003/0187847 A1 | 10/2003 | Lubbers | |
| 2003/0187947 A1 | 10/2003 | Lubbers | |
| 2003/0188085 A1 | 10/2003 | Arakawa | |
| 2003/0188114 A1 | 10/2003 | Lubbers | |
| 2003/0188119 A1 | 10/2003 | Lubbers | |
| 2003/0188153 A1 | 10/2003 | Demoff | |
| 2003/0188218 A1 | 10/2003 | Lubbers | |
| 2003/0188229 A1 | 10/2003 | Lubbers | |
| 2003/0188233 A1 | 10/2003 | Lubbers | |
| 2003/0191909 A1 | 10/2003 | Asano | |
| 2003/0191919 A1 | 10/2003 | Sato | |
| 2003/0196023 A1 | 10/2003 | Dickson | |
| 2003/0212781 A1 | 11/2003 | Kaneda | |
| 2003/0229651 A1 | 12/2003 | Mizuno | |
| 2003/0236953 A1 | 12/2003 | Grieff | |
| 2004/0019740 A1 | 1/2004 | Nakayama | |
| 2004/0022546 A1 | 2/2004 | Cochran | |
| 2004/0024838 A1 | 2/2004 | Cochran | |
| 2004/0024961 A1 | 2/2004 | Cochran | |
| 2004/0030727 A1 | 2/2004 | Armangau | |
| 2004/0030846 A1 | 2/2004 | Armangau | |
| 2004/0049634 A1 | 3/2004 | Cochran | |
| 2004/0078641 A1 | 4/2004 | Fleischmann | |
| 2004/0168034 A1 | 8/2004 | Homma | |
| 2004/0215602 A1 | 10/2004 | Cioccarelli | |
| 2004/0230859 A1 | 11/2004 | Cochran | |
| 2004/0267959 A1 | 12/2004 | Cochran | |

* cited by examiner

SYSTEM AND METHOD FOR ENSURING MERGE COMPLETION IN A STORAGE AREA NETWORK

This application is a continuation of U.S. patent application Ser. No. 10/106,909, entitled System and Method for Ensuring Merge Completion in a Storage Area Network, filed Mar. 26, 2002, now U.S. Pat. No. 7,032,131, the disclosure of which is hereby incorporated by reference in its entirety.

FIELD OF THE INVENTION

The present invention relates generally to computer-based information storage systems, and more specifically to systems and methods for managing disk space allocated to logging in a Storage Area Network.

BACKGROUND

Recent years have seen a proliferation of computers and storage subsystems. Early computer systems relied heavily on direct-attached storage (DAS) consisting of one or more disk drives coupled to a system bus. More recently, network-attached storage (NAS) and storage area network (SAN) technology are used to provide storage with greater capacity, higher reliability, and higher availability.

Mass data storage systems are implemented in networks or fabrics that provide means for communicating data between systems that use data, and the storage systems that implement the physical storage. In many cases, host computers act as storage servers and are coupled to the network and configured with several disk drives that cumulatively provide more storage capacity or different storage functions (e.g., data protection) than could be implemented by a DAS system. For example, a server dedicated to data storage can provide various degrees of redundancy and mirroring to improve access performance, availability and reliability of stored data. A large storage system can be formed by collecting storage sub-systems, where each sub-system is managed by a separate server.

More recently, virtualized storage systems such as the STORAGEWORKS Enterprise Virtual Array announced by Compaq Corporation in October, 2001 provide storage controllers within a fabric or network that present virtualized storage to hosts that require data storage in a manner that enables the host to be uninvolved in the physical configuration, allocation and management of the storage devices. In this system, hosts simply access logical units of storage that appear to the host as a range of logical address space. Virtualization improves performance and utilization of storage.

SAN systems enable the possibility of storing multiple copies or "replicas" of data at various physical locations throughout the system. Data replication across multiple sites is desirable for a variety of reasons. To provide disaster tolerance, copies of data stored at different physical locations is desired. When one copy becomes unavailable due to equipment failure, a local network outage, natural disaster or the like, a replica located at an alternate site can allow access to the data. Replicated data can also theoretically improve access in normal operation in that replicas can be accessed in parallel, avoiding bottlenecks associated with accessing a single copy of data from multiple systems.

However, prior storage systems were organized such that one site had a primary role and another site was a replica. Access requests were handled by the primary site until failure, at which time the replica became active. In such an architecture, the replica provided little benefit until failure. Similarly, the resources allocated to creating and managing replicas provided minimal load balancing benefit that would enable data access requests to be directed intelligently to replicas such that resources were used more efficiently. Moreover, when multiple replicas are distributed throughout a network topology, it would be beneficial if network delays associated with accessing a topologically remote storage subsystem could be lessened.

It is desirable to provide the ability for rapid recovery of user data from a disaster or significant error event at a data processing facility. This type of capability is often termed 'disaster tolerance'. In a data storage environment, disaster tolerance requirements include providing for replicated data and redundant storage to support recovery after the event. In order to provide a safe physical distance between the original data and the data to backed up, the data is migrated from one storage subsystem or physical site to another subsystem or site. It is also desirable for user applications to continue to run while data replication proceeds in the background. Data warehousing, 'continuous computing', and enterprise applications all benefit from remote copy capabilities.

Compaq Corporation introduced an array controller referred to as the HSG80, that implemented Data Replication Management features, as described in U.S. patent application Ser. No. 09/539,745 (U.S. Pat. No. 6,601,187) assigned to the assignee of the present application and incorporated herein by reference, that implemented an architecture utilizing redundant storage controllers. While effective, each of the controllers comprised one port that was dedicated to user data, and a separate port that was dedicated to data replication functions. In general, the HSG80 architecture defined relatively constrained roles for each network element. That is to say, data replication was managed between a defined pair of sites, where one element of the pair was designated in a primary role, and the other element of the pair was designated in a replica role. Despite the fact that each controller had two ports for communicating with other controllers, one of the ports was constrained in the role of handling user data, and the other port was constrained in the role of handling data replication. While easing implementation, these designated roles limited the flexibility and functionality with which the data replication could be performed.

Similarly, prior data replication management solutions simplified the management problems by assigning fixed roles to storage locations. A particular storage site would be designated as a primary when it handled operational data traffic, and another site would be designated only as a secondary or backup site. Such architectures were unidirectional in that the backup site was not available for operational data transactions until the failure of the primary site. Such rigidly assigned roles limited the ability to share storage resources across diverse users and applications. Moreover, configuration of such systems was complex as it was necessary to access and program storage controllers at both the primary and secondary sites specifically for their designated roles. This complexity made it impractical to expand data replication to more than two sites.

Therefore, there remains a need in the art for a data storage system capable of providing flexible data replication services without the direct involvement of the host computer. Moreover, a data storage system is needed that is readily extensible to provide multiple replication, load balancing, and disaster tolerance without limitations imposed by designating rigid roles for the system components.

SUMMARY

The present invention addresses these and other needs by providing, in one aspect, a data storage system adapted to maintain redundant data storage sets at a remote location(s). The data storage system establishes a copy set comprising a source volume and a destination volume. Data written to a source volume is automatically copied to the destination volume. The data storage system maintains a data log that may be activated when the destination volume is inaccessible due to, for example, a malfunction in the destination storage system or in the communication link between the source system and the destination system. I/O commands and the data associated with those commands are written to the data log, and after destination system becomes available the information in the data log is merged into the destination volume to conform the data in the destination volume to the data in the source volume. The data log competes for memory space (i.e., disk capacity) with other volumes on the system, and log memory is allocated as needed. During the merge process the system maintains the ratio of merge data writes out of the data log to data writes from a host computer into the data log within a desired range until the data log reaches a predetermined size, whereupon data writes into the data log are quiesced to permit the merge write process to complete.

In one aspect, the invention provides a method for managing memory (i.e., disk capacity) allocated to a data log in a source data storage system during a merge process wherein data in the data log may be merged into corresponding data on a destination storage system connected to the source data storage system by at least one communication link. The method comprising the steps of maintaining a ratio of merge writes out of the data log to writes from a host computer into the data log within a desired range until the data log reaches a predetermined size, and quiescing writes from a host computer into the data log until the data log is fully written to the destination storage system.

In another aspect, the invention provides a computer program product for use in connection with a processor for managing memory allocated to a data log in a source data storage system during a merge process wherein data in the data log may be merged into corresponding data on a destination storage system connected to the source data storage system by at least one communication link. The computer program product comprises logic instructions, executable on a processor, for maintaining a ratio of merge writes out of the data log to writes from a host computer into the data log within a desired range until the data log reaches a predetermined size; and logic instructions, executable on a processor, for quiescing writes from a host computer into the data log until the data log is fully written to the destination storage system.

BRIEF DESCRIPTION OF THE DRAWINGS

The above objects, features and advantages of the present invention will become more apparent from the following detailed description taken in conjunction with the accompanying drawings, in which.

DETAILED DESCRIPTION

The present invention may be implemented in a storage system comprising a data backup and remote copy system that provides disaster tolerance. In particular, the present invention may be implemented in a storage system that provides a peer-to-peer remote copy (backup) function implemented as a controller-based replication of one or more LUNs (logical units) between two remotely separated pairs of array controllers connected by one or more suitable communication links. A system in accordance with the present invention provides a data logging mechanism (e.g., a write history log unit) for storing commands and associated data for I/O transactions that occur when the remote backup storage device is unavailable, e.g., because the communication links have failed, a destination site is down, or because the destination site has failed. When the destination site becomes available, the system performs an in-order merging of the log unit data with the data on the previously unavailable backup device to quickly return the source and destination sites to the same data state after link restoration or destination site restoration.

The present invention is described with various levels of specificity to ease description and understanding. However, unless specified otherwise, the specific implementations are examples only, and not limitations of the invention. For example, network connectivity is illustrated by fibre channel mechanisms, however, other network mechanisms provide suitable functionality in particular environments. In particular implementations, storage capacity is presented as SCSI (small computer system interface) logical units, although the particular protocol is readily varied to meet the needs of a particular application.

Figure 1:
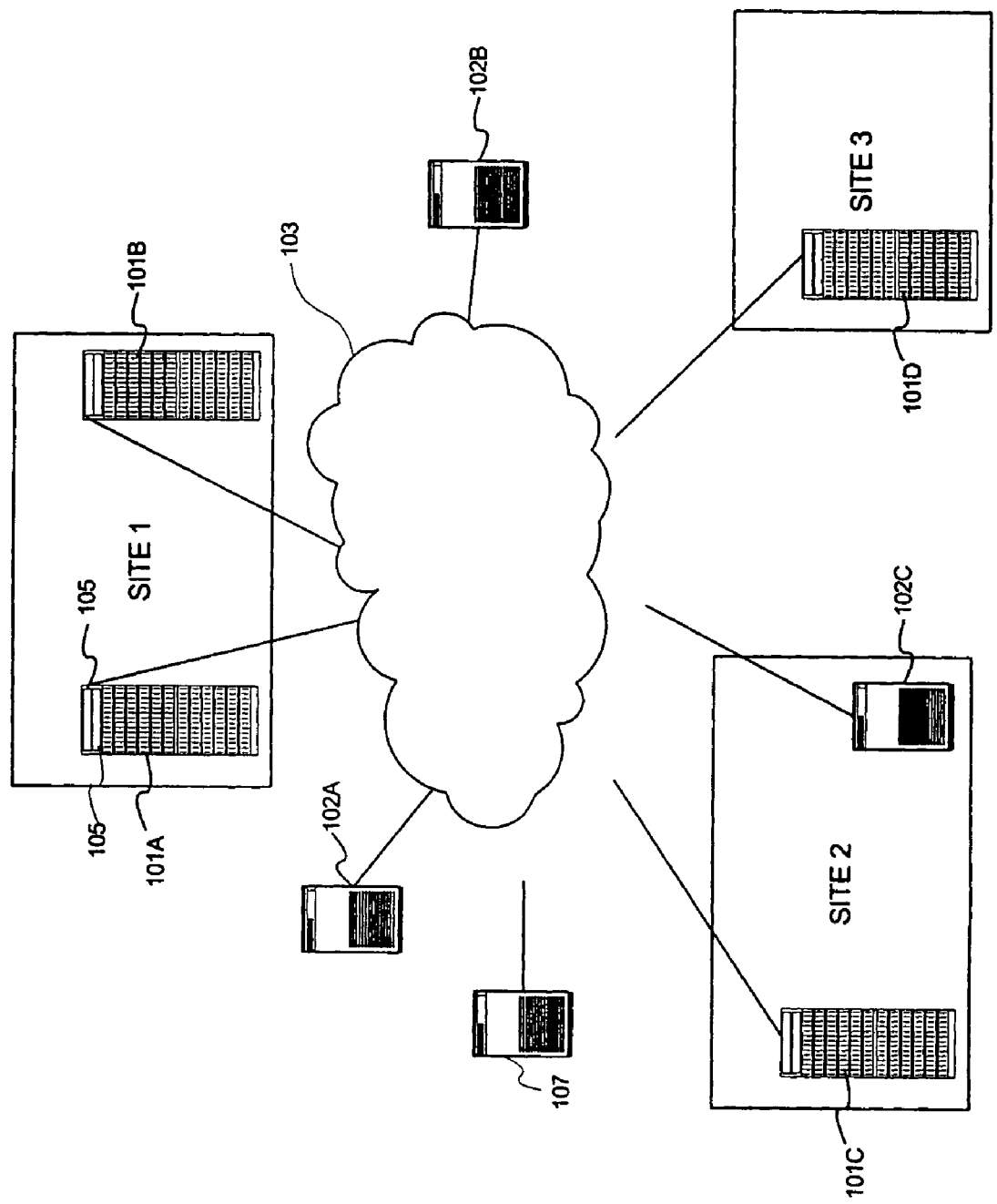
FIG. 1 shows a storage area network (SAN) environment in which the present invention is implemented.

FIG. 1 illustrates a multi-site storage area network (SAN) implementing features in accordance with present invention. The example shown in FIG. 1 includes only three sites (Site 1, Site 2 and Site 3) for to ease illustration and understanding, however, it should be understood that any number of sites may be provided to meet the needs of a particular application. The various sites may be physically proximate, or separated by an arbitrary distance. A particular implementation may well limit the number of possible sites, and may well limit the maximum or minimum physical separation of sites. Each site includes one or more storage cells 101, such as cells 101A, 101B, 101C and 101D. Any number of storage cells 101 may be included in any site, although the number implemented in any particular application may be constrained to meet the needs of that application.

The storage implemented at various sites is accessed by host computer 102, such as host computers 102A, 102B and 102C. Host computers are generally machines that consume or require data storage. Typical host computers 102 demand large quantities of storage such as mainframes, web servers, transaction processors, and the like. However, a host computer 102 may comprise a computer of any processing capacity that requires or benefits from network storage either to reduce cost of the host 102, implement more storage capacity than practical in a host 102, share data amongst multiple hosts 102, or the like. A host computer 102 may couple to the storage cells 101 via a connection to network 103 such as illustrated by host computers 102A and 102B. In many cases, a host computer 102 will be located in a site such as host computer 102C located in site 2. The topological location of host computers 102 is a matter of design choice selected to meet the needs of the particular application. In many cases, one or more host computers 102 will be located at a site. It should be appreciated, however, that host computers 102 have little to do with the management and configuration of the DRM system of the present invention, other than the reality that as consumers of data, the DRM system is preferably able to satisfy storage needs of host computers 102 at various physical and topological locations.

Storage cells 101 and hosts 102 couple to data communication network 103. Storage cells 101 implement a quantity of data storage capacity that is accessible through storage controllers 105 that implement one or more connections to network 101. Storage cells 101 typically implement hundreds of gigabytes to terabytes of physical storage capacity. Preferably, controllers 105 virtualize the physical storage capacity such that it is configurable into logical units (LUNs) of storage capacity. The LUNs implement an arbitrary quantity of logical address block storage, where each LUN has a specified level of data protection such as RAID 0-5 data protection.

The logical construction or context of a storage cell 101 comprises the logical and data structures that are used to represent, manage and configure the raw physical storage capacity into devices that can be accessed by hosts 102 in a desired manner. To do this, controllers 105 implement and manage various logical objects that implement data structures and behavior to represent various components of each storage cell 101, preferably without involvement if hosts 102. All objects in the system are identified with a universally unique identification (UUID). The UUIDs are stored persistently in metadata structures within the physical storage which enables all or part of a storage cell, and all the LUNs implemented therein, to be mapped and presented by any storage controller 105. In a data replication application, the ability to present the LUNs and the context in which they exist is useful, as described in greater detail below, in event of a controller failure at one of the replica sites.

Of particular significance to the present invention is a logical object representing each LUN that is presented to a host system 102. In addition to the UUID, LUNs are also identified by a worldwide LUN ID (WWLID) which identifies the LUN to hosts 102. Hosts 102 access physical storage capacity by addressing read and write operations to specified LUNs using the WWLID, and can be otherwise unaware of the physical storage architecture or data protection strategy for a particular LUN that is being accessed. Storage controllers 105 manage the tasks of allocating physical storage capacity to specified LUNs, monitoring and maintaining integrity of the LUNs, moving data between physical storage devices, and other functions that maintain integrity and availability of the data stored therein.

Network 103 comprises any of a variety of available networks, and may comprises a plurality of interconnected networks. In particular examples, network 103 comprises at least two independent fibre channel fabrics to provide redundancy. These fibre channel fabrics may comprise long-distance connection mechanism 201 such as asynchronous transfer mode (ATM) and internet protocol (IP) connections that enable sites to be separated by arbitrary distances.

At least one SAN management appliance (SMA) 107 is coupled to network 103 to enable connections to storage cells 101. In practice, a number of SMAs 107 are provided, and typically an SMA 107 is located at each site to provide management operation for the storage cells 101 at that site. However, because each SMA 107 communicates through network 103, the physical location of SMAs 107 is arbitrary. SMAs 107 are preferably implemented at topological locations that provide redundant connections to the storage cells 101.

Figure 2:
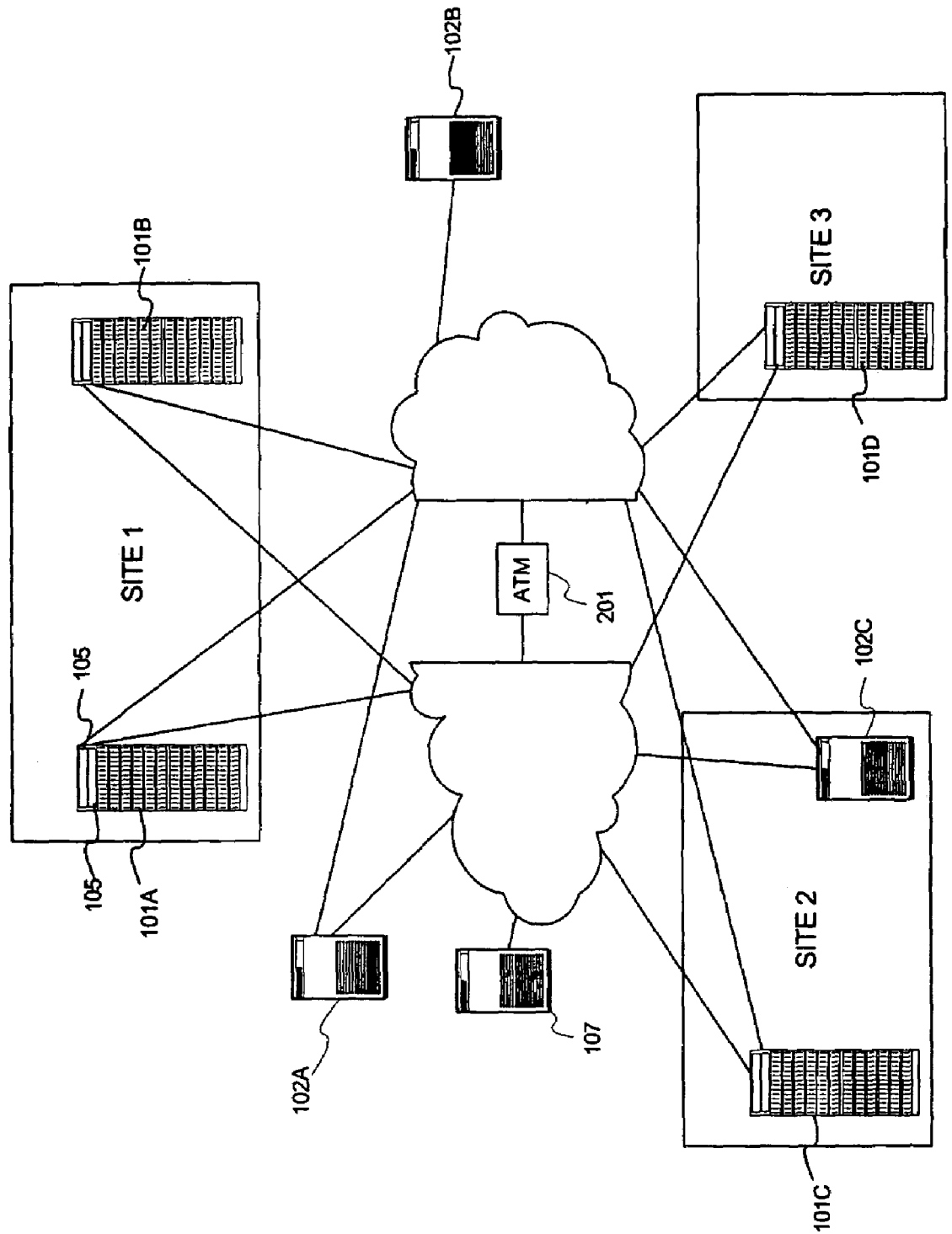
FIG. 2 illustrates an alternative SAN environment embodying the present invention.

Network 103 is accessible directly or indirectly to all components at Site 1, Site 2, and Site 3 including hosts 102 and controllers 105. In preferred implementations, each component has redundant links to network 103, and network 103 is preferably implemented as having redundant sub-networks as shown in FIG. 2. Redundancy provides connectivity in event of failure or degradation of some portions of network 103. Redundancy also enables connectivity in event of failure or degradation of controllers 105 and/or interface components of hosts 102. In prior data replication systems, it was known to provide multiple channels between components, however, these channels were not interchangeable. For example, each controller might have two host ports to a network, however, one of the ports was designed to support operational data traffic while the other port was dedicated to data replication operations. While this division of responsibility was simpler to implement, it increased the likelihood that one or the other of the ports would be used at less than full capacity. Moreover, special purpose ports are not completely redundant, hence the system would be vulnerable to failure of one or the other of the channels. Even where two controllers were provided, this asymmetry between ports affected performance.

In the systems of FIG. 1 and FIG. 2, it is important to realize that storage cell 101 is able to function as a primary storage location for any of hosts 102, and at the same time function as a secondary or alternative storage location for a replica of data from another storage cell 101. This feature is referred to as "bi-directionality". Unlike prior DRM systems where sites were rigidly configured as either primary or secondary sites, the present invention provides for flexible assignment at a much finer level of granularity, preferably such that individual virtual disks can be designated as either primary or alternate. One effect of such flexibility is that it becomes practical to implement enormous quantities of storage in each storage cell 101 as the capacity at each site can be readily applied to various applications with disparate storage needs.

Figure 3:
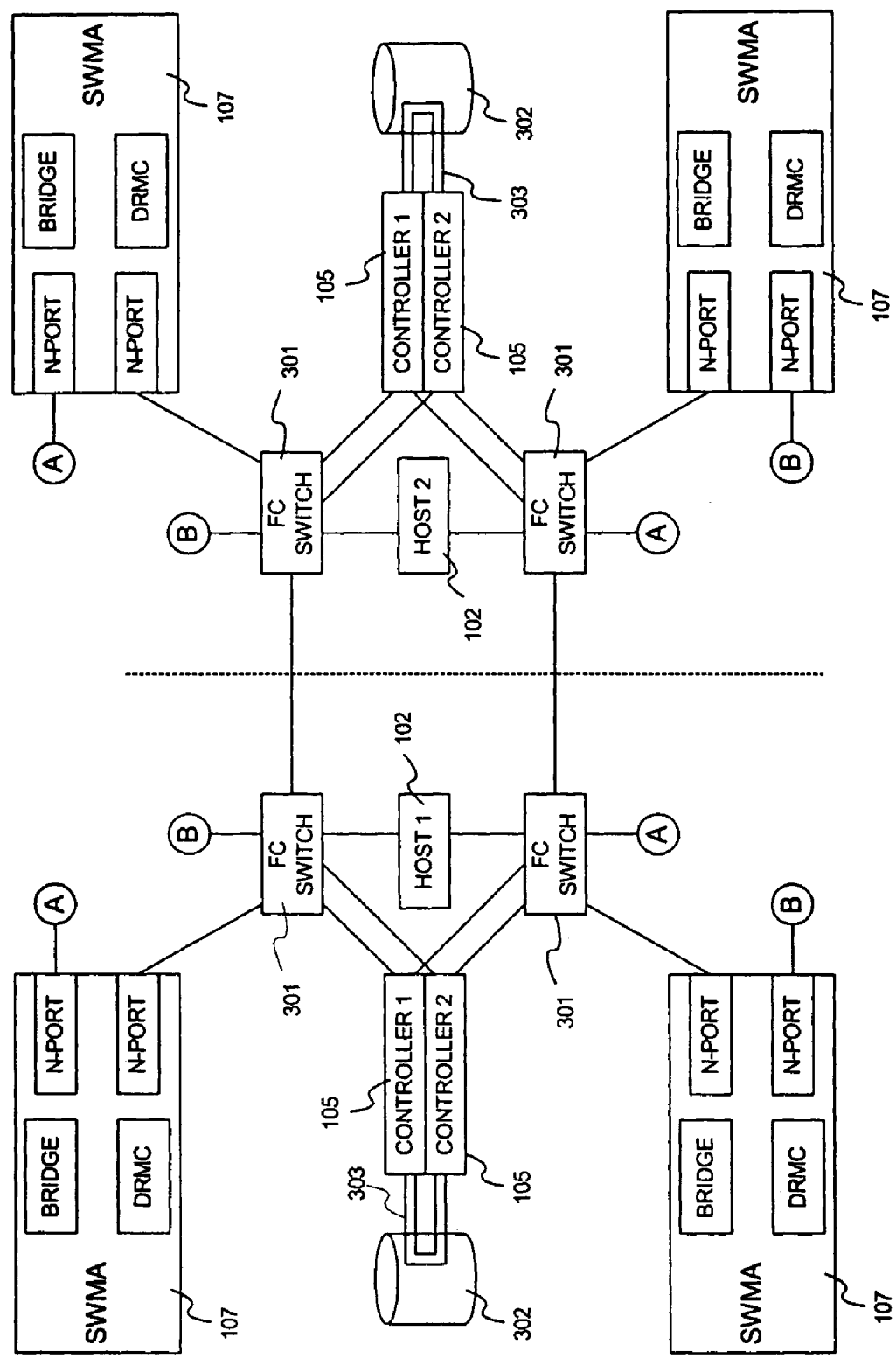
FIG. 3 shows an implementation emphasizing redundant connections to improve disaster tolerance.

FIG. 3 illustrates various features of the present invention embodied in a disaster tolerant configuration. The configuration of FIG. 3 emphasizes redundancy in physical components. As a result, multiple paths exist between any host and any storage. Storage management appliances 107 include a bridge and a data replication management console (DRMC) which are cooperative software processes that each present a user interface for configuration and monitoring of DRM processes. The bridge functions as an element manager for controllers 105, and handles basic functions of connecting to the communication network 103, issuing commands to controllers 105, and implementing security policies. All customer configuration and monitoring of DRM activities goes through the bridge. The DRMC is provides increased functionality over the Bridge interface, by managing solely DRM storage and providing assists, such as with site recovery.

One goal of a disaster tolerant configuration in FIG. 3 is to provide hardware redundancy for multiple levels of fault tolerance in order to keep the primary and alternate sites running, almost at 'non-stop' metrics (seconds per year downtime, barring disaster or planned downtime). In the face of single component failures at a site, DRM will failover to a redundant component at that site to allow continued operation. If a significant failure happens to the primary site, then data processing can be resumed at the alternate site where the data is intact. Database or application recovery is achieved with little or no downtime.

In this regard, wherever redundant components are provided, they are preferably interchangeable in accordance with the present invention such that functionality of one component can be taken over by a redundant component. For example, node ports in the SMA 107 are redundant such that failure of one node port can be handled by moving functions handled by that port over to the other, non-failed node-port.

Physical storage devices 302 are coupled to controllers 105 by a high-speed redundant connection such as fibre channel arbitrated loop (FCAL) connections 303 in FIG. 3. An FCAL connection allows each of tens or hundreds of individual hard disk drives to be accessed not only at high speed, but by either controller 105 in a storage cell. Further, by providing redundant FCALs, one FCAL can fail while each storage device 302 remains accessible by either controller. The present invention is largely independent of the specific implementation of physical storage devices 302, and it is contemplated that other physical storage architectures will provide suitable equivalents for purposes of the present invention.

FIG. 3's disaster tolerance configuration provides for high availability with a dual fabric implemented by switches 301, dual hosts 102, and dual storage topology, where a single switch, host, or storage can fail and the system can still continue access on the SAN. Each fabric is composed of two switches 301, with the switches connected to each other over what is called an E-port, or expansion port. The E-port can be a connection with distances that vary depending on technology. Fibre Channel allows for 10 km and with extenders up to 100 km. ATM provides for 'round the world ' distances. New technology, called FC-BB (Fibre Channel Backbone), provides the opportunity to extend Fibre Channel over leased TELCO lines (also called WAN tunneling). There is no theoretical constraint imposed on the number of switches 301, although a particular implementation may choose to impose such a constraint. With more switches 301, the fabric 103 becomes more complex and port-to-port communications may require more "hops". Hence, both the latency and the variability in latency increases with more complex fabrics.

Hosts 102 preferably run multi-pathing software that dynamically allows failover between storage paths as well as static load balancing of storage volumes (LUNs) between the paths of controllers 102. Multi-pathing software enables a host 102 to identify multiple connection options that lead to desired storage, and select amongst the available paths based on selected criteria. These criteria may vary widely, but typically include path availability, path performance, path load, controller load, and the like. This allows for applications to continue given any failure of fabric or the controllers. A lower cost variant of this configuration uses a fabric comprising only one switch, such that there is no E-port. Such a configuration may be appropriate for shorter distances.

Figure 4:
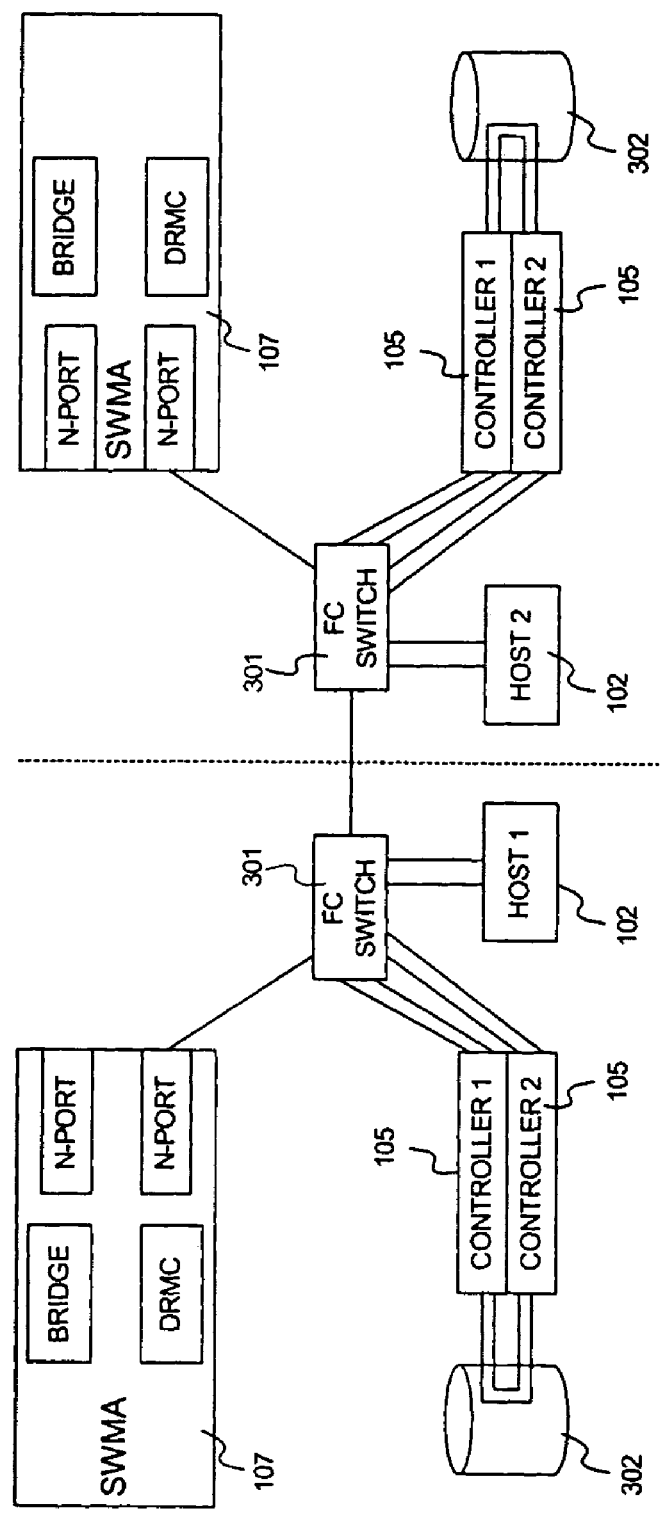
FIG. 4 illustrates an implementation with less redundancy than the implementation of FIG. 3.
Figure 5:
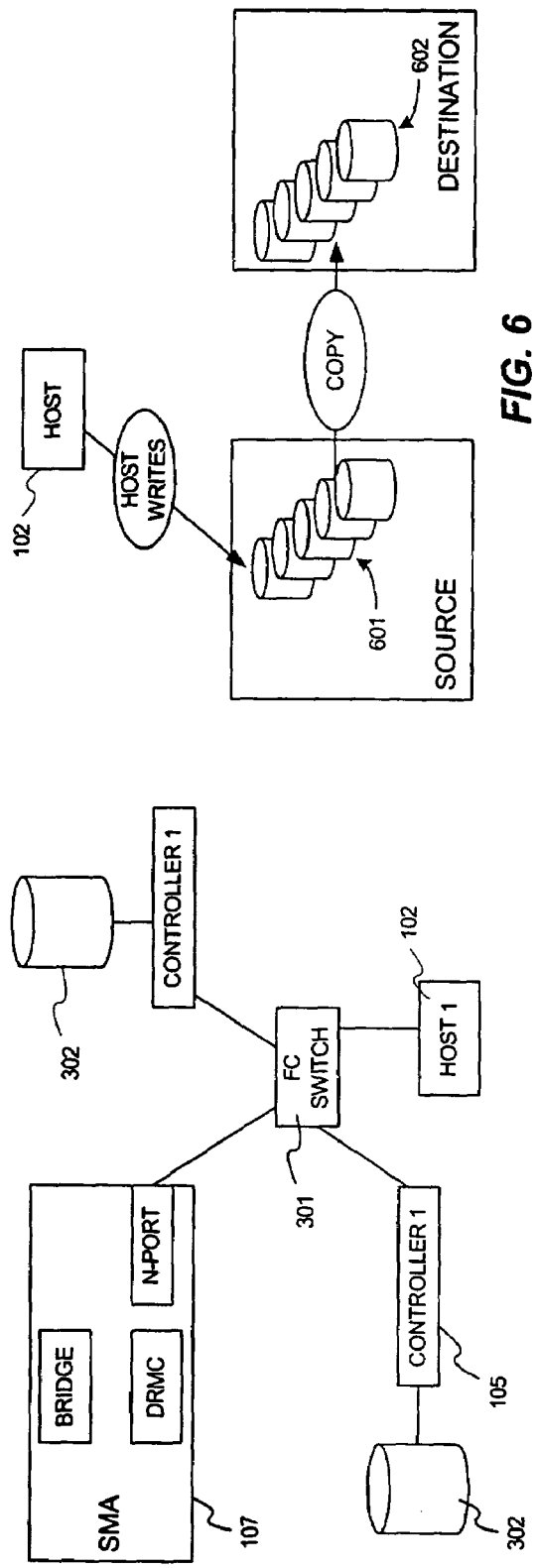
FIG. 5 illustrates a basic implementation of the present invention.

FIG. 4 illustrates a configuration of the present invention that emphasizes data movement rather than redundancy of the example in FIG. 3. The configuration of FIG. 4 provides a lower cost solution ideal for customers only interested in data backup, data migration, data distribution, and data mining. FIG. 4 has a single fabric formed by two interconnected switches. With shorter distances, an even lower cost variant could use only one switch, such that there is no E-port. FIG. 5 illustrates an even more basic configuration using a fabric having a single switch 301, one host 102, and non-redundant controllers 105.

Because ports of controllers 105 are configured to handle both operational data transactions and DRM traffic, a single port connection between each controller 105 and switch 301 is all that is necessary to implement data replication features of the present invention. However, the basic configuration shown in FIG. 5 sacrifices much redundancy, and would not be recommended for most applications. It is important to understand that a great deal of flexibility exists in configuring the present invention for specific applications. Redundant connections and components can be added and removed flexibly to meet the needs of a particular application. Hence, various features of the configurations shown in FIG. 1 through FIG. 5 can be mixed and matched to configure a specific implementation.

A SAN, such as shown in FIG. 1 through FIG. 5, is established by coupling controllers 105 and hosts 102 to switch 301, or a fabric formed from multiple switches 301. Each of the devices perform a log in operation according to applicable fibre channel standards. The log in operation involves an exchange of information in which each device is registered with the fabric 103, and devices can discover other devices that are registered with fabric 103. In the preferred implementations, each controller 105 is identified by a storage cell unique identification number (UUID) which is stored by a name server in fabric 103. By way of this registration and discovery process, each controller 105 can obtain knowledge necessary to connect to any other controller 105.

As noted before, metadata needed to map and present a storage cell 101 including the UUIDs of the various objects in that storage cell is stored persistently. Because of this, in the event of a destination controller failure, another controller 105, typically a redundant or partner controller 105 in the same storage cell 101 as the failed controller 105, can reconstruct the storage cell 101. Both a controller and its partner are typically operational at the same time. Some LUNs are presented on one controller and some on the other. When a controller fails, the other controller presents the LUNs that were being presented on the failed controller. This is referred to as "failover." Other controllers 105 involved in a copy set can continue to locate the migrated presentations of storage cell 101, and continue data replication operations without loss of data or requiring manual processes. The ability to implement this level of failure recovery substantially or wholly automatically is unprecedented.

In the event of a connection failure between a source controller 105 and a destination controller 105, the source controller 105 can readily identify each available alternate controller 105 and continue operation without loss of data or requiring manual intervention. A connection failure or link failure is distinct from a controller failure in that the controllers 105 remain operational, but unable to maintain a data communication link with one or more other controllers 105. In response to a connection failure, the source controller has several options, depending on the nature of the failure. When the source controller 105 is unable to link to fabric 103, suggesting a failure in a port of switch 301, the controller 105 can attempt to use an alternate link to fabric 103, or a redundant fabric 103 if available. When the link between fabric 103 and a destination controller 105 has failed, the source controller 105 attempts to establish a new link with a redundant port of the destination controller 105. In both of these cases, there will be no need to migrate the presentatinon of LUNS, and data replication operations will proceed with substantially no interruption, and in most cases without any need to notify the host 102 of the aberrant condition. In contrast, prior systems had only one port on each controller available for DRM operations and so a link failure would require migrating the presentation of either the source or destination LUN in an alternate controller.

In some cases a link failure may require migration of a LUN from one controller 105 to another. For example, if all ports on either the destination or source controllers 105 failed (which would typically be considered a controller failure), or several ports to fabric 103 failed simultaneously in particular combination, recovery would require migrating presentation of one or more LUNs from one controller 105 to a redundant or partner controller 105 in a manner similar to a controller failure event. This migration can be performed efficiently using the mechanisms for mapping and presenting a storage cell 101 described above. Notably, the storage cell does not need to be mapped and presented in its entirety before pending data replication operations can be completed. In implementations where the LUNs are virtualized, as described in co-pending patent application Ser. No. 10/040,194 entitled "SYSTEM AND METHOD FOR ATOMIZING STORAGE" filed on Oct. 22, 2001 (U.S. Patent No. 6.895.467) and which is assigned to the assignee of the present invention and incorporated herein by reference, it is possible to implement only so much of the data structures needed to represent the portion of the LUN that is the subject of a pending data transaction. The remainder of the LUN can be implemented either on demand or as a background process without affecting data integrity.

Figure 6:
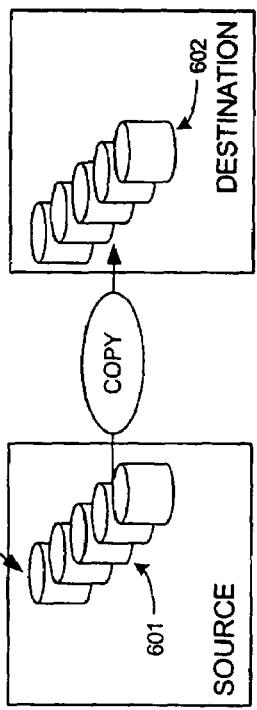
FIG. 6 shows data flow relationships in a data replication management operation in accordance with the present invention.

FIG. 6 shows hierarchical relationships defined in accordance with the present invention to model data replication management. Prior to performing DRM operations, a storage cell 101 is implemented at each site, and a virtual disk 601 is allocated within a storage cell 101 that is handing operational data with one or more hosts 102. For any particular copy set, one virtual disk 601 is designated as a source, although it should be understood that a source virtual disk 601 may be allocated at any site implementing the DRM features of the present invention. Virtual disk 601 may comprise a plurality of physical storage resources that span multiple physical drives within the storage cell 101, and may implement any desired capacity and data protection type.

A destination virtual disk 602 is allocated within a storage cell 101 at a designated alternative or destination site. In normal operation, write operations are directed to source virtual disk 601, and copied in a background process to one or more destination virtual disks 602. Destination virtual disk has the same logical storage capacity as the source virtual disk, but may provide a different data protection configuration. Controllers 105 of the destination storage cell handle the allocation of destination virtual disk 602 autonomously. This allocation involves creating data structures that map logical addresses to physical storage capacity, and in a particular implementation involve processed described in greater detail in U.S. patent application Ser. No. 10/040,194.

The actual allocation and copying of data may take up to several minutes to several hours in the case of storage of many gigabytes or terabytes. These processes can be streamlined by allocating and copying only logical storage blocks that are used in source virtual disk 601. For example, a virtual disk 601 may implement 1 terabyte of storage, but a sparsely populated example may use only a few gigabytes of capacity to store actual data. In accordance with the present invention, destination virtual disk 602 will reserve resources needed to implement the entire 1 terabyte, but will only allocate and copy the locations that are actually used to store data and may allocate the other locations. This greatly reduces the resources required to implement and maintain a replicate at the destination, and reduces the time required to create replicates.

A "copy set" is a set of member virtual disks where each member virtual disk is a replica of the others, and may comprise any number of replica virtual disks. While it may be easier to describe and understand the present invention by designating one virtual disk as a source or original virtual disk and the others as destinations or replicas, it is important to understand that once the copy set is created each member virtual disk is essentially a peer of all others. To create a copy set, the user designates a virtual disk as the source, and an alternate site storage cell (not a virtual disk) for the destination. The destination virtual disk does not exist prior to the copy set creation operation. Instead, it is created specifically to be a member of the copy set. Because each destination or alternative virtual disk is created on demand, it is created specifically and automatically to be compatible with the copy set. Hence, there is little or no manual procedures that must be performed to create new members for a copy set. This allows the copy set to increase (or decrease) its membership readily.

As noted before, a LUN is identified to a host 102 by a WWLID. One feature of a particular embodiment of the present invention is that each LUN in a copy set is presented to hosts 102 using the same WWLID. In this manner, the LUN appears to the host 102 as a single LUN that can be accessed by multiple paths. Preferably, each controller 105 that manages one of the LUNs in a copy set can be queried by a host 102 to determine a particular LUN or controller 105 (identified by the UUID) that is preferred (but not mandatory) for use by that host for access to the LUN. This feature supports large fan out in that any number of LUNs in a copy set can be presented as a single LUN with replication between the LUNs handled automatically by controllers 105 without involving hosts 102.

Initially, when a controller 105 at the destination site is requested to create a destination virtual disk, it determines whether its storage cell has sufficient resources (e.g., storage capacity) to service the request, reserves the necessary resources if available, and responds back to the controller 105 at the source site that the destination virtual disk is created. An existing virtual disk cannot be used for the destination. This process is very quick as the destination virtual disk is not actually allocated, and the data is not actually copied from source to destination at this time. Once the source virtual disk 601 receives this confirmation, it can continue normal operations while the actual allocation of virtual disk 602 and copying of data can occur as background processes. Hence, the actual time that source virtual disk 602 is quiesced during the data replication initialization is a few milliseconds. It is also possible that accesses to source virtual disk 601 can be cached or buffered during the initialization process so that no downtime is observed from the hosts 102. A controller may support tens, hundreds, or thousands of copy sets, limited only by the practical constraint of the computing resources (e.g., memory and processing power) needed to manage the number of copy sets.

To implement a copy transaction between a source and destination, a path to the alternate site is found and a connection is established. This connection need not be a persistent connection, although for data that frequently changes, a persistent connection may be efficient. Preferably, heartbeat is initiated over the connection. Heartbeats are in both directions, meaning the source site generates a heartbeat on each connection, and the alternate site(s) generates a heartbeat on each connection. Heartbeat timeout intervals are adaptive based on distance (computed round trip delay).

An attempt is made to choose paths by not moving the units between controllers. In other words, a controller that is used to create the source or destination virtual disks is initially preferred, which constrains the number of available paths initially. The chosen path/connection is used until it breaks, then an attempt is made to find another path. The port/path selection algorithm may include other default designations such as a preferred fabric or switch, or preferred ports on controllers, or similar default preferences that may operate to select among redundant resources.

Figure 7:
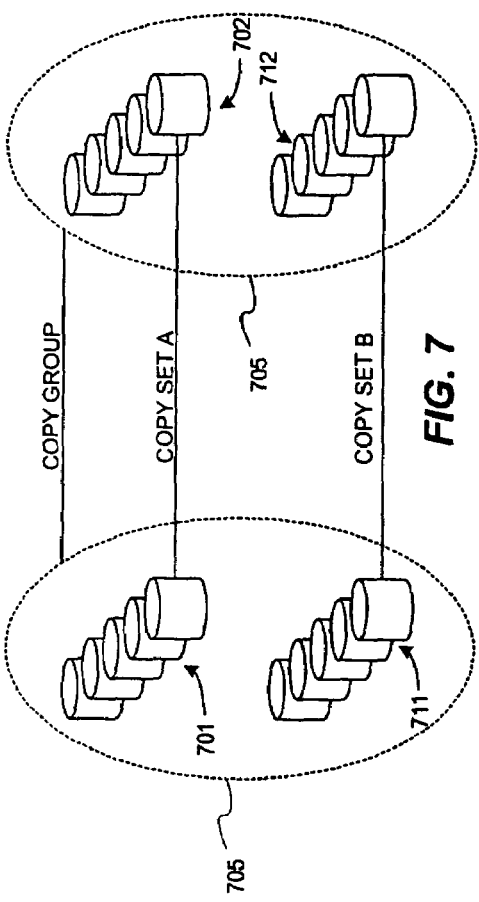
FIG. 7 illustrates logical relationships between data structures of the present invention.

In the preferred implementation, objects do not span sites or storage controllers. Instead, objects exist at each site and are associated with each other as suggested in FIG. 7. For instance, the controller views a "DRM Group" 705 as a source group associated with a destination group (represented by a dashed-line oval in FIG. 7). The controller does not have a copy set object per se, rather group members (virtual disks) that are associated with a remote member's (virtual disks). The copy set is represented by this association. In FIG. 7, virtual disks 701 are associated with virtual disks 702 to form a copy set and virtual disks 711 are associated with virtual disks 712 to form another copy set.

DRM groups 705 are used for maintaining crash consistency and preserving order among source virtual disks. The design requires that every copy set belong to a group 705. The consistency property applies when the group has more than one member. More than one virtual disk should be added to a group only if the application requires it (for example a database and its journal might benefit from multiple virtual disks in a group). Generally, a group should comprise only one member for optimal performance.

A group maintains write ordering among the members for asynchronous operation and logging/merging. Asynchronous operation refers to an operation mode in which a modification to one member of a copy set can be propagated to other members of the copy set after a time delay. During this time delay, the various replicas are inexact. When asynchronous operation is allowed, it is important that all replicas eventually implement the modification. Since multiple modification operations may be pending but uncommitted against a particular replica, it is necessary that the original order in which the modifications were presented be preserved when the pending modifications are applied to each replica. Even where asynchronous operation is not explicitly allowed, a destination LUN may become unavailable for a variety of reasons, in which case a copy set is implicitly operating in an asynchronous mode.

To ensure write order preservation, a log, i.e., anonvolatile cache, is maintained for each group 705 that records the history of write commands and data from a host. The log is sized to store all write transactions until the transaction is committed to each member of a copy set. When required, the log can be replayed to merge the pending writes, in order, to each remote group 705. When required, the cached writes can be written to a log on media along with subsequent host writes and then later replayed to merge the pending writes, in order, to each remote group 705. The ordering algorithm uses a "group sequence number" and the remote groups 705 ensure that the data is written in order sequence. Group members enter and exit logging at the same time, to assure order across the volumes.

Virtual disks in a group should have the same alternate site. A group is limited to 32 virtual disks in a particular implementation. A virtual disk can belong to at most one group. Virtual disks in the same DRM group 705 may belong to different disk groups. When a group object is created on the primary site controller, the controller automatically creates a symmetric group object on the alternate site controller. A group is created during copy set creation, if the user chooses not to use an existing group.

At a site, all members of a group are be on the same controller in a dual pair to enforce cache coherency (i.e., not split between dual controllers). The preferred storage controller should be the same on all members. When members are added to a group, they are automatically moved to reside on the same controller, and thereafter will failover together. If the preferred storage controller is changed on one member, it will change the setting for all members. These constraints create a configuration in which all members in a group share the same connection/path between source and destination sites. Different groups may share the same connection/path to the same alternate site or a different one. If more than one member in a group needs to copy, then they are copied one at a time with a queue depth selected to keep the pipe full for optimal performance.

One benefit of the flexible architecture described above is that the number of replicas in a copy set can be increased. As noted hereinbefore, conventional systems allow only one replica in a given copy set. In accordance with the present invention, any number of replicas can be included in a copy set. This is because roles can be switched dynamically between source and destination which eases propagation of data across multiple members. Also, because the storage at each site is virtualized, LUNs of any desired size and configuration can be automatically configured from physical storage capacity available at that site. Accordingly, there is no need to specially configure hardware or software at each site in order to implement a LUN that is compatible with a given copy set. Because each controller 105 can automatically increase the size or change the configuration of the LUN(s) it manages, the manual tasks involved to increase the size of a LUN do not grow geometrically or exponentially with the number of replicas in the copy set. Instead, the user simply manages the LUN as a single entity, and the implementation of changes in each replica is handled automatically.

It is apparent that the system of the present invention provides efficiency in that redundant components can operate simultaneously and in parallel to provide improved throughput as well as serving during failover to replace functionality of failed systems and connections. Because system components have few constraints on their functionality, the present invention allows great flexibility in implementing a particular system to emphasize any balance of, for example, low latency, high availability, disaster tolerance, and cost.

Having described an exemplary storage area network architecture in which the present invention may be implemented, attention is now directed to operational features implemented in various embodiments of the invention FIGS. 8–11 are flowcharts illustrating operational aspects of an exemplary storage system. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on the computer or other programmable apparatus create means for implementing the functions specified in the flowchart block or blocks. In an exemplary embodiment, the computer program instructions may be executed on a processor in an array controller of a storage system.

These computer program instructions may also be stored in a computer-readable memory that can direct a computer or other programmable apparatus to function in a particular manner. The instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions. In an exemplary embodiment, the logic instructions illustrated in FIGS. 8–11 are embodied in software that executes on an array controller in a storage area network.

Figure 8:
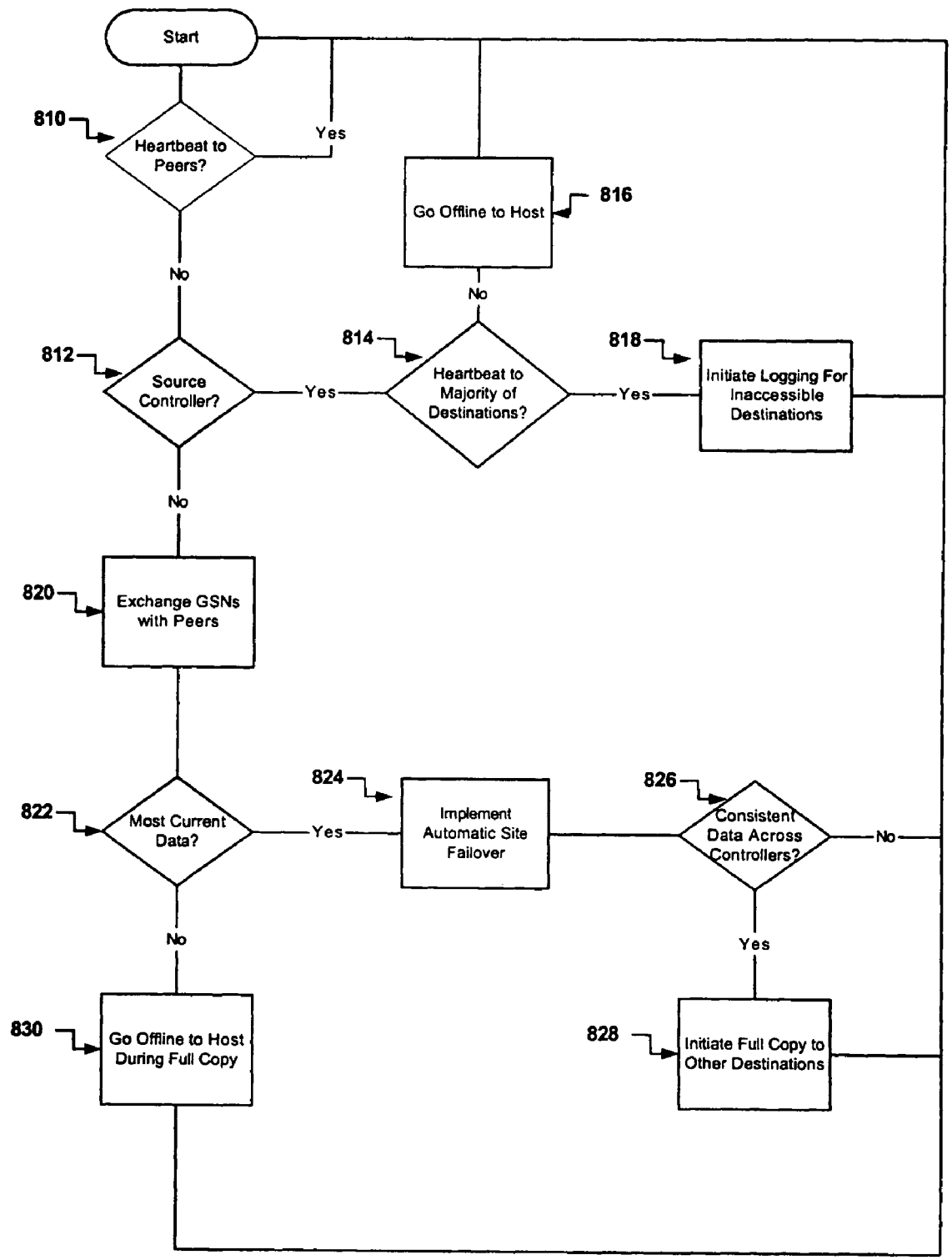
FIG. 8 is a flowchart illustrating steps in an automatic site failover routine implemented by a controller in an exemplary embodiment of the invention.

FIG. 8 is a flowchart illustrating the operations executed by a controller in the event a site failover operation is necessary. Examples of site failover situations include a destination controller failure, a switch failure, or a failure in the communication link between controllers. Referring to FIG. 8, a storage controller periodically sends "heartbeats" to and receives "heartbeats" from peer controllers. As used herein, the term "heartbeats" refers to pings that each controller in a group periodically transmits to its peer controllers. The peer controllers respond to the ping with a message that includes that includes information useful in managing data transfer processes between peer controllers. In addition, each storage controller collects information related to the round trip time consumed by the heartbeat and the communication path the heartbeat traversed. In sum, heartbeats are used to maintain tunnels. The inability to maintain a tunnel between storage cells causes the "sites" to declare each other "inaccessible".

Referring to FIG. 8, at step 810 the controller exercises a background process to determine whether it is receiving a heartbeat from its peer controllers. In normal operation the controller will receive regular heartbeats from its peers, so the process simply executes repeatedly in the background. If the controller determines that it is not receiving a heartbeat from its peers, then the controller determines whether it is the source controller in the DRM group for which the heartbeat has failed (step 812). If the controller is acting as the source controller, then at step 814 the controller determines whether there is a heartbeat with a majority of destination controllers in the group. This may be accomplished, e.g., by transmitting a new heartbeat to destination sites in the group and monitoring the replies, or by reviewing heartbeat information saved from recent heartbeats. In an exemplary embodiment, a full-duplex path between one controller and another is referred to as a "tunnel". Each controller at the end of the tunnel "pings" the other controller on a periodic basis, e.g., every one second. A controller that receives a ping responds with a "ping response". After a number of failures to receive ping responses, based on round trip delay, a tunnel is simply declared dead and is closed. There may be an attempt to form a tunnel on a different path if one can be found. A site may be declared dead with respect to another site when no tunnel can be formed to it for a specified period measured in seconds. What happens then depends on user supplied parameters.

If at step 814 the controller determines that there is not a heartbeat to the majority of destinations, then the controller goes offline to the host (step 816). This renders the DRM group inaccessible to the host. In addition, the controller may generate a warning or other signal indicating that the controller requires service. By contrast, if at step 814 the controller determines that there is a heartbeat to the majority of the destinations, then the controller initiates a data logging process as described in greater detail below (step 818).

Referring back to step 812, if the controller set does not contain the source controller a procedure is initiated to determine which of the destination controllers should take over as the source controller for the group. In an exemplary embodiment, the decisive factor is which of the peer controllers has the most current data, one indicator of which is the GSN number. At step 820 the controller exchanges GSNs with peer destinations. At step 822 it determines whether it has the most current data, e.g., by comparing its GSN with the GSNs from the peer controllers. If the controller has the highest GSN, then at step 824 the controller implements and automatic site failover routine an installs itself as the source controller for the DRM group and bumps the Generation Number for the group, which indicates that it is the current source.

At step 826 the controller determines whether the data under the supervision of the peer controllers is consistent. In an exemplary embodiment, this may be determined by comparing the GSNs of the various controllers. If the GSNs differ, then the data states of various controllers differ, and the new source controller initiates a full copy of the data set to the other destinations (step 828). In another implementation, all sites may maintain a log of recent transactions (GSN, VBA, LUN, Block Count). If the transactions are known between the highest GSN and the lowest GSN at every site, only the data for specific transactions is copied. The mechanisms for using GSNs make this process relatively simple as the new source may simply retransmit the data it has from the lowest GSN to the highest GSN to all other sites. Those sites that already have the data for a given transaction will simply discard it, replying with success.

If at step 822 the controller does not have the most current data, then the controller goes offline to the host to receive a full copy from the controller that assumes the role of the source controller (step 830).

In an exemplary embodiment, the user of the storage system (e.g., a system administrator) may designate a particular destination to assume the role of a source controller. In this event, the logic in FIG. 8 is overridden to permit a full copy from the controller having the most current data.

When the original source comes back online, it will no longer be the source and will transition automatically to the role of a destination. Its data is synchronized, e.g., by executing a full copy. In an alternate embodiment, the new source controller may begin logging. In this case, the original source may be restored by using a variant of the merge process that reconciles writes it received that were not transmitted. If no such writes exist, which may be determined by comparing the GSNs, the standard merge process can be used.

In an exemplary embodiment of the invention, an adaptive allocation algorithm is employed during the data logging process to allocate disk capacity to the log unit in an efficient manner. This adaptive allocation algorithm is explained more clearly with reference to FIG. 9. At step 910, a controller sets an initial disk capacity allocation increment, and at step 912 a controller allocates a log memory segment. During the data logging process, I/O operations from the host computer are copied into the log unit's cache buffers (step 914). During the logging function, a controller compares the speed and amount of data a host is writing with the speed and amount of log space being allocated. If the log allocation process is not keeping up with the incoming log data, then a controller increases the amount of storage requested for the log unit. By contrast, if the log allocation process is requesting too much log space, then the amount of log space requested is adjusted downwardly.

In one embodiment, a controller determines whether the difference between the incoming data rate and the log memory segment allocation rate is greater than a first predetermined threshold (step 916), and if so then the controller increases the memory allocation increment (step 918). By contrast if the difference between the incoming data rate and the log memory segment allocation rate is not greater than a first predetermined threshold (step 916), then the controller determines whether the difference between the incoming data rate and the log memory segment allocation rate is less than a second predetermined threshold (step 920), and if so then the controller decreases the memory allocation increment (step 922). By contrast, if the if the difference between the incoming data rate and the log memory segment allocation rate is not less than a second predetermined threshold, then control passes back to step 912.

Figure 9:
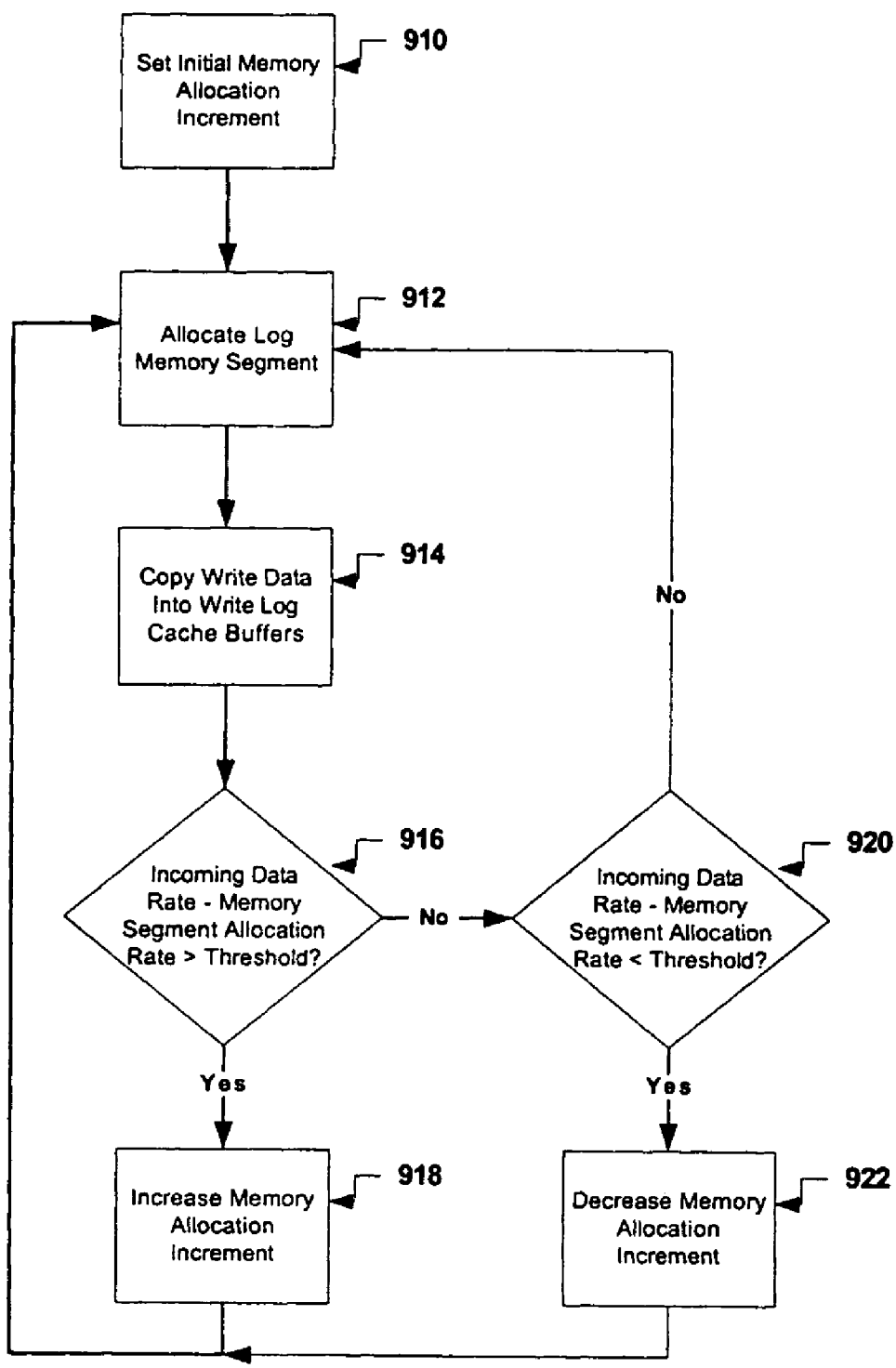
FIG. 9 is a flowchart illustrating steps in an adaptive disk space allocation routine implemented by a controller in an exemplary embodiment of the invention.

The adaptive allocation algorithm set forth in FIG. 9 permits the memory allocation segment increment to increase or decrease as a function of the incoming data rate. The first and second thresholds may be fixed or variable, and may be set by the system administrator or by the equipment manufacturer.

Log operations continue until the destination system(s) come back online, at which point the log data may be transmitted to the destination site(s) and merged into the volume at the destination(s). Write operations from the host computer to the data log may continue during the merge process. In an exemplary embodiment, a method of merging log data manages the data flow through the data log by implementing a catch-up ratio and a log quiesce function. This permits the merging process to complete in a timely fashion so that normal back-up operations can continue.

More specifically, a processor associated with the data log may monitor the ratio of logging writes to merge writes, and may try to keep the ratio within a desired range. For example, storage system may implement a routine that ensures that the merge function is able to complete in a timely manner so the storage system can revert to normal replication procedures. In an exemplary embodiment, the system maintains a ratio of merge write I/Os out of the data log to host write I/Os into the data log within a desired range until the data log reaches a predetermined size, whereupon write I/Os into the data log are quiesced to permit the data log merge to be completed. The merge write I/Os are transmitted to a destination storage system, where they are merged into the target LUN on the destination storage system.

For example, the ratio may be maintained at a range of four merge write I/Os out of the data log for each write I/O into the data log. It will be appreciated, however, that the merge ratio may vary. Increasing the ratio of merge write I/Os to host write I/Os too much may diminish the performance of the storage system to users accessing the system through a host computer. By contrast, maintaining the ratio too low may unduly extend the amount of time required to complete the merge process. Preferably, the ratio is maintained at a level greater than 1:1.

If the log becomes filled, i.e., if the data log consumes the entire disk capacity available for the logging operation, then the source database is marked for a full-copy operation, the merging is halted, and the disk space for the log may be deallocated. It will be noted that if the user configured only one disk group (LDAD) on the storage cell, then the log could use the entire amount of storage space available. The log filling synchronously can occur because an LMAP, an Rstore, or other suitable storage allocation, is unavailable, the GSN has attempted to wrap around, the command region has overflowed into the data region, or the data region has reached the end of the logically allocated memory space. In addition, the log can fill asynchronously when a competing process requests Rstores that have been allocated by the log. In this event, the log Rstores are deallocated to free up space to satisfy the competing process request. Further, if the data log becomes larger than the data source stored on the host computer, then it is more efficient to effect a full copy of the data source than to execute a merge routine on the data log. In this case, the data logging process may be may be terminated, the data log may be dumped, and the data source may be marked for a full copy. To effect this feature, a processor in the controller may execute logic instructions that periodically compare the size of the data log with the size of the underlying data source, i.e., the primary data set. If the difference between the size of the underlying data source and the data log exceeds a predetermined threshold, then the array controller may execute logic instructions for terminating the data logging process, dumping the data log, and marking the data source for a full copy.

In another aspect, the system inserts non-significant blocks of data, referred to as 'burp blocks' or 'burps', into the data log write buffers to maintain the continuity of the data stream. This permits the data to be handled more efficiently than a non-continuous data stream. By way of example, all data buffers in the system may be configured as 2K (four blocks) buffers. However, a host write, and therefore its logged data, may be less than four blocks. To increase space efficiency, the controller packs the log data from as many host writes as possible into a single buffer. For instance, if a host writes blocks of size 1,1,1,1 or 1,2,1, then the controller can pack them into one buffer. A burp block is used when we can't pack the writes in efficiently. For example, assume the host writes blocks of size 1,2,3. The third write won't fit so the controller inserts a burp block in the last block of the buffer and starts the 3 block write in the next buffer. Two other ways of addressing this problem cause inefficiencies in either space allocation or processing time. The first inefficient way is to use a buffer for every host write so a sequence of 1,1,1,1 would use end up taking four 2K buffers; a huge waste of resources. The other is to pack tight. A host write of sequence 1, 2, 3, 2 would then only take up two 2K buffers. However, processing that 3 block write in the middle of the sequence would require extra dma request because it is split across two buffers.

Figure 10:
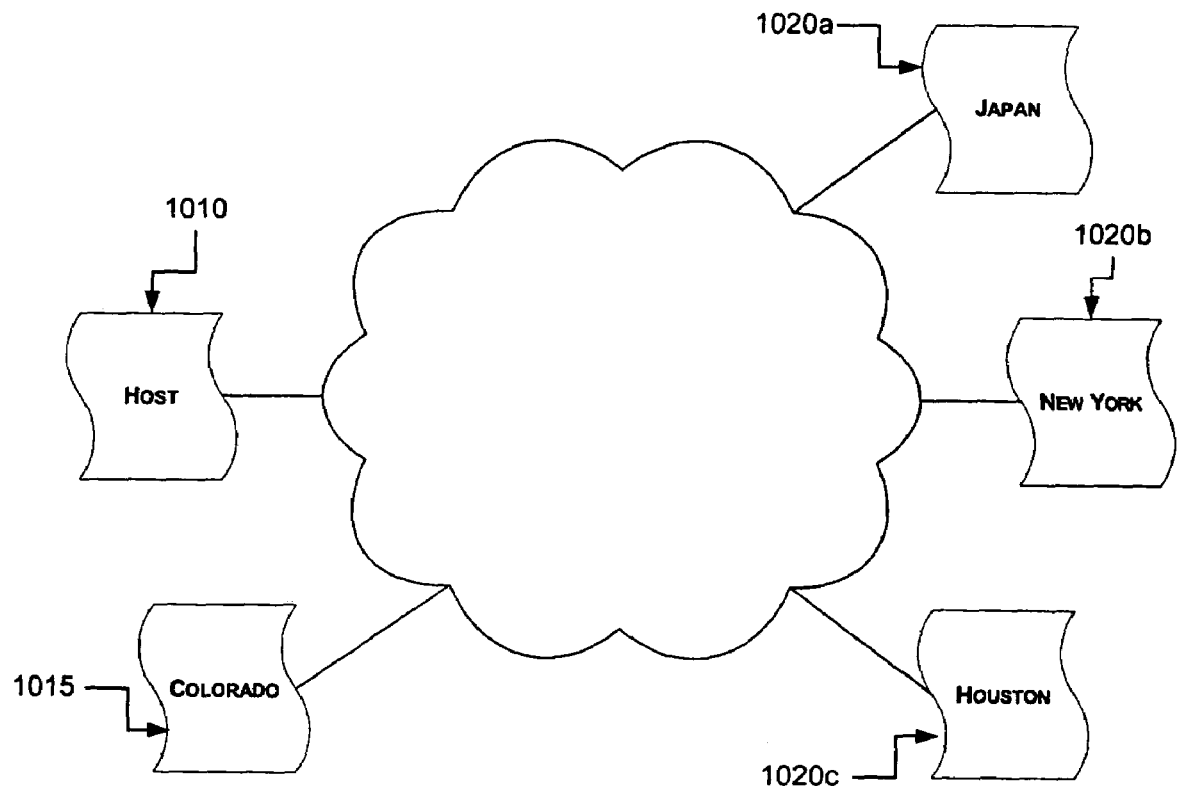
FIG. 10 is a schematic depiction of a storage area network having multiple destinations.

In yet another aspect, the storage system may be adapted to support two or more destination replication systems. This is illustrated in FIG. 10, in which a host computer 1010 executes writes that are directed to a source storage system 1015 in Colorado, which maintains redundant copies in storage systems 1020a in Japan, 1020b in New York, and 1020c in Houston. If any one (or more than one) of the destination systems becomes inaccessible, then the system in Colorado initiates a data logging procedure as described above. When one (or more) of the destination systems 1020 comes back online the data storage system 1010 in Colorado initiates a merge function to write the logged data onto the destination system(s).

The source storage system 1015 in Colorado implements a concept referred to as a "merge fence" to manage the merge process. The merge fence indicates which write entry is being merged. In an exemplary embodiment, the merge fence may be based on the GSN. When the merge is initiated the merge fence is set to the lowest GSN of all logging destinations that are presently online (i.e., accessible). Merge writes are then started from that entry. If another destination is added to the merge, then the merge fence will be reset, again to the lowest GSN of the logging destinations that are currently online. As the merge process is executed, the merge data is transmitted to each destination that includes a GSN equal to the merge fence. By contrast, if a destination's GSN is above the merge fence, then the write is skipped.

Figure 11:
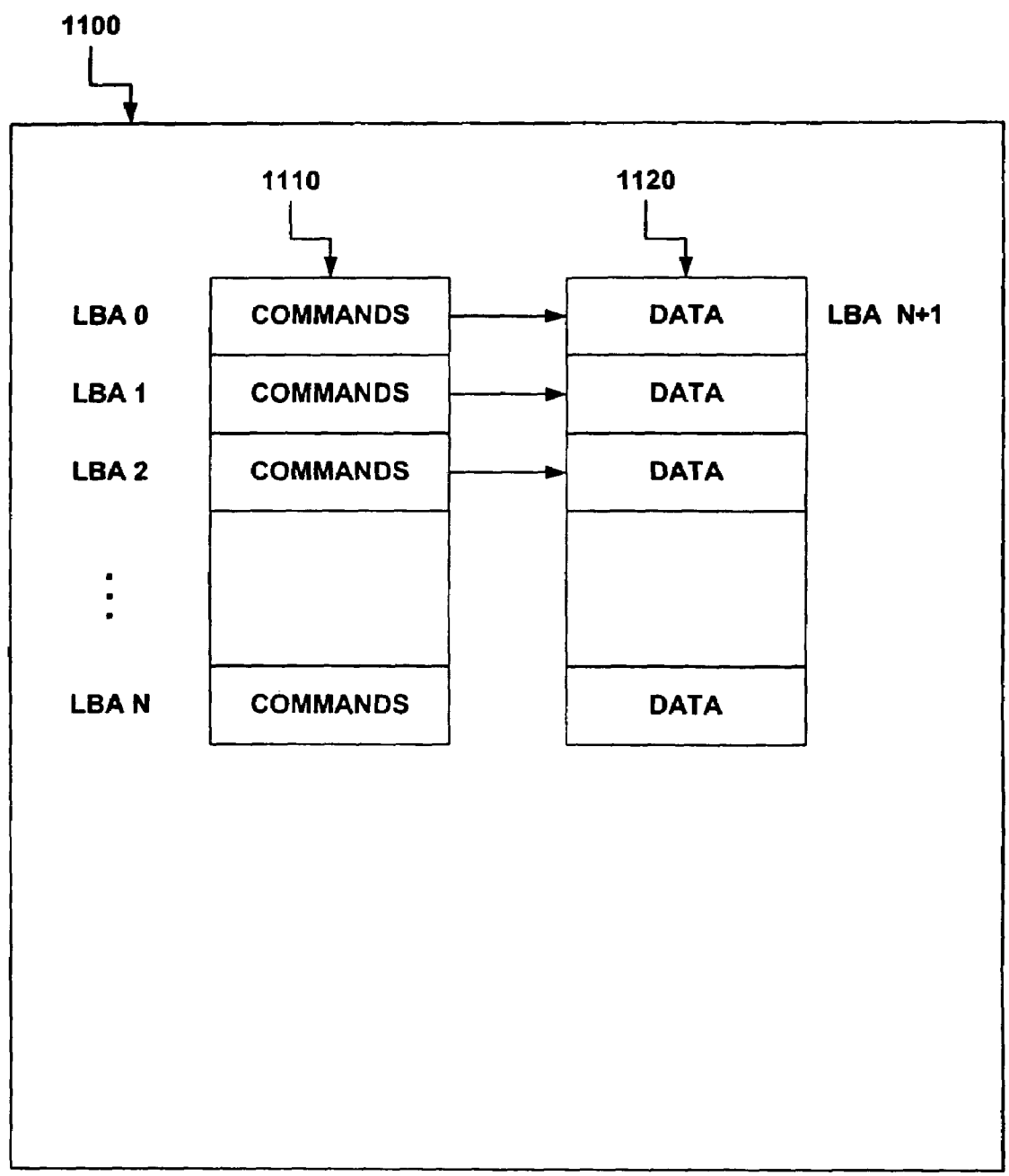
FIG. 11 is a schematic depiction of memory allocation in a data log in accordance with an exemplary embodiment of the invention.

FIG. 11 is a diagram showing an exemplary data format for information stored in a data log. As shown in FIG. 11, data log 1100 may be divided into a command region 1110 and a data region 1130. The command region 1110 may occupy the logical address space from Logical Block Address (LBA) zero (0) through LBA N, where N is a parameter that may be determined by the system designer or the system operator. The data region begins at an LBA that may also be selected as a parameter by the system user. The boundaries of the command region may be stored in a header file associated with the data log.

Each entry in the command region includes the write command information including, for example, the type of log command issued by the controller and the LBA specified in the write command. In addition, each command entry may include an offset pointer that specifies the LBA of the first data segment where the data associated with the write command will be stored, the number of blocks specified in the write command, whether special flag bits referred to as "e-bits" are set, and the DRM member (LUN) to which the data was written.

Although the above description refers to specific embodiments of the invention, the invention is not necessarily limited to the particular embodiments described herein. It is to be understood that various other adaptations and modifications may be made within the spirit and scope of the invention as set forth in the appended claims.

What is claimed is:

1. A method for managing disk capacity allocated to a data log in a source data storage system during a merge process wherein data in the data log may be merged into corresponding data on a destination storage system connected to the source data storage system by at least one communication link, the method comprising the steps of:
  maintaining a ratio of merge writes out of the data log to writes from a host computer into the data log within a desired range until the write process reaches a predetermined distance from the end of the data log by performing operations comprising:
    determining a difference between an incoming data rate and a log memory segment allocation rate;
    increasing a memory allocation increment when the difference is greater than a first threshold value or decreasing a memory allocation increment when the difference is less than a second threshold value; and
  quiescing writes from a host computer into the data log until the data log is fully written to the destination storage system.

2. The method of claim 1, including the additional step of sending the host computer a write completion status message prior to sending the data to the destination storage system.

3. The method of claim 1, further comprising the step of performing a transaction-order merging of data from the log unit with data previously stored on the destination storage system to return the data on the source data storage system and the destination storage system to a consistent data state.

4. The method of claim 3, wherein host computer continues to write said data from the host computer to the data log during a portion of the time the merging is being performed.

5. The method of claim 1, wherein the data log comprises a storage set treated as a logical unit by the array controller.

6. The method of claim 1, wherein data written by the host computer is stored in cache memory in a first array controller in transaction order.

7. The method of claim 1, wherein data written by the host computer is written in synchronous mode.

8. The method of claim 1, wherein data written by the host computer is written in asynchronous mode.

9. The method of claim 1, wherein the ratio of merge writes to host writes is maintained greater than 1:1.

10. A storage controller, comprising:
  a processor;
  a memory module communicatively coupled to the processor and comprising logic instructions which, when executed by the processor, configure the processor to manage disk capacity allocated to a data log in a source data storage system during a merge process, wherein data in the data log may be merged into corresponding data on a destination storage system connected to the source data storage system by at least one communication link, by performing operations comprising:
    maintaining a ratio of merge writes out of the data log to writes from a host computer into the data log within a desired range until the write process reaches a predetermined distance from the end of the data log; and
    quiescing writes from a host computer into the data log until the data log is fully written to the destination storage system.

11. The storage controller of claim 10, further comprising logic instructions which, when executed by the processor, configure the processor to send the host computer a write completion status message prior to sending the data to the destination storage system.

12. The storage controller of claim 10, further comprising logic instructions which, when executed by the processor, configure the processor to perform a transaction-order merging of data from the log unit with data previously stored on the destination storage system to return the data on the source data storage system and the destination storage system to a consistent data state.

13. The storage controller of claim 10, further comprising logic instructions which, when executed by the processor, configure the processor to write said data from the host computer to the data log during a portion of the time the merging is being performed.

14. The storage controller of claim 10, wherein the data log comprises a storage set treated as a logical unit by the array controller.

15. The storage controller of claim 10, wherein data written by the host computer is stored in cache memory in a first array controller in transaction order.

16. The storage controller of claim 10, wherein data written by the host computer is written in synchronous mode.

17. The storage controller of claim 10, wherein data written by the host computer is written in asynchronous mode.

18. The storage controller of claim 10, wherein the ratio of merge writes to host writes is maintained greater than 1:1.

19. The storage controller of claim 10, further comprising logic instructions which, when executed by the processor, configure the processor to:
 determine a difference between an incoming data rate and a log memory segment allocation rate; and
 increase a memory allocation increment when the difference is greater than a first threshold value.

20. The storage controller of claim 10, further comprising logic instructions which, when executed by the processor, configure the processor to
 determine a difference between an incoming data rate and a log memory segment allocation rate; and
 decrease a memory allocation increment when the difference is less than a second threshold value.

21. A method for managing disk capacity allocated to a data log in a source data storage system during a merge process wherein data in the data log may be merged into corresponding data on a destination storage system connected to the source data storage system by at least one communication link, the method comprising the steps of:
 maintaining a ratio of merge writes out of the data log to writes from a host computer into the data log within a desired range until the write process reaches a predetermined distance from the end of the data log by:
  determining a difference between an incoming data rate and a log memory segment allocation rate; and
  increasing a memory allocation increment when the difference is greater than a first threshold value; and
 quiescing writes from a host computer into the data log until the data log is fully written to the destination storage system.

22. The method of claim 21, further comprising sending the host computer a write completion status message prior to sending the data to the destination storage system.

23. The method of claim 21, further comprising performing a transaction-order merging of data from the log unit with data previously stored on the destination storage system to return the data on the source data storage system and the destination storage system to a consistent data state.

24. The method of claim 21, wherein host computer continues to write said data from the host computer to the data log during a portion of the time the merging is being performed.

25. The method of claim 21, wherein maintaining a ratio of merge writes out of the data log to writes from a host computer into the data log within a desired range until the write process reaches a predetermined distance from the end of the data log comprises:
 determining a difference between an incoming data rate and a log memory segment allocation rate; and
 decreasing a memory allocation increment when the difference is less than a second threshold value.

26. A storage controller, comprising:
 a processor;
 a memory module communicatively coupled to the processor and comprising logic instructions which, when executed by the processor, configure the processor to manage disk capacity allocated to a data log in a source data storage system during a merge process, wherein data in the data log may be merged into corresponding data on a destination storage system connected to the source data storage system by at least one communication link, by performing operations comprising:
  maintaining a ratio of merge writes out of the data log to writes from a host computer into the data log within a desired range until the write process reaches a predetermined distance from the end of the data log by:
   determining a difference between an incoming data rate and a log memory segment allocation rate; and
   increasing a memory allocation increment when the difference is greater than a first threshold value; and
  quiescing writes from a host computer into the data log until the data log is fully written to the destination storage system.

27. The storage controller of claim 26, further comprising logic instructions which, when executed by the processor, configure the processor to send the host computer a write completion status message prior to sending the data to the destination storage system.

28. The storage controller of claim 26, further comprising logic instructions which, when executed by the processor, configure the processor to perform a transaction-order merging of data from the log unit with data previously stored on the destination storage system to return the data on the source data storage system and the destination storage system to a consistent data state.

29. The storage controller of claim 26, further comprising logic instructions which, when executed by the processor, configure the processor to write said data from the host computer to the data log during a portion of the time the merging is being performed.

30. The storage controller of claim 26, wherein the data log comprises a storage set treated as a logical unit by the array controller.

31. The storage controller of claim 26, wherein data written by the host computer is stored in cache memory in a first array controller in transaction order.

32. The storage controller of claim 26, further comprising logic instructions which, when executed by the processor, configure the processor to
 determine a difference between an incoming data rate and a log memory segment allocation rate; and
 decrease a memory allocation increment when the difference is less than a second threshold value.

* * * * *